(12) United States Patent
Nine et al.

(10) Patent No.: US 8,485,542 B1
(45) Date of Patent: Jul. 16, 2013

(54) SUSPENSION SYSTEM FOR A VEHICLE

(75) Inventors: Forest H. Nine, Bloomfield Hills, MI (US); Glenn A. Whitehead, Novi, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/369,339

(22) Filed: Feb. 9, 2012

(51) Int. Cl.
*B60G 11/02* (2006.01)

(52) U.S. Cl.
USPC .............................. 280/124.17; 280/124.175

(58) Field of Classification Search
USPC ....................... 280/124.17, 124.174, 124.175
See application file for complete search history.

(56) References Cited

U.S. PATENT DOCUMENTS

| | | | |
|---|---|---|---|
| 2,002,152 A | 5/1935 | Moon | |
| 6,428,025 B1 * | 8/2002 | Suh | ........................ 280/124.106 |

* cited by examiner

*Primary Examiner* — Faye M. Fleming
(74) *Attorney, Agent, or Firm* — Frederick A. Krieger

(57) ABSTRACT

The present disclosure provides a suspension system for a vehicle that includes a primary load bearing system and a secondary load bearing system. The primary load bearing system is disposed between a frame and an axle of the vehicle, and is continually loaded. The secondary load bearing system is also disposed between the frame and the axle of the vehicle, but the secondary load bearing system is operable between a loaded condition and an unloaded condition. During the loaded condition, the secondary load bearing system is contacted by an engaging member attached to the frame such that a load carried by the vehicle is supported by the primary load bearing system and the secondary load bearing system. During the unloaded condition, the secondary load bearing system is isolated from the frame and the axle.

18 Claims, 3 Drawing Sheets

SUSPENSION SYSTEM FOR A VEHICLE

FIELD

The present disclosure relates to suspension system for a vehicle including a leaf spring.

BACKGROUND

This section provides background information related to the present disclosure which is not necessarily prior art.

Suspension systems connect a vehicle to its wheels. Suspension systems serve a dual purpose. The system contributes to the vehicle's roadholding/handling and braking for good active safety and driving pleasure, and keeping vehicle occupants comfortable and reasonably well isolated from road noise, bumps, and vibrations. These goals are generally at odds, so the tuning of suspensions involves finding the right compromise. It is important for the suspension to keep the road wheel in contact with the road surface as much as possible because all of the forces acting on the vehicle do so through the contact patches of the tires.

One type of suspension system is a leaf spring suspension system. Leaf spring suspension systems are beneficial when the vehicle is carrying an increased load. Unfortunately, when leaf spring suspension systems are loaded 100 percent of the time, higher friction in the system results, which causes a feeling of stiffness and roughness while driving. Accordingly, while providing for good roadholding/handling and braking, leaf spring suspension systems may not be optimal for isolating road noise, bumps, and vibrations from the vehicle's occupants.

SUMMARY

The present disclosure provides a suspension system for a vehicle that includes a primary load bearing system and a secondary load bearing system. The primary load bearing system is disposed between a frame and an axle of the vehicle, and is continually loaded. The secondary load bearing system is also disposed between the frame and the axle of the vehicle, but the secondary load bearing system is operable between a loaded condition and an unloaded condition. During the loaded condition, the secondary load bearing system is contacted by an engaging member attached to the frame such that a load carried by the vehicle is supported by the primary load bearing system and the secondary load bearing system. During the unloaded condition, the secondary load bearing system is isolated from the frame and the axle.

Further areas of applicability of the present disclosure will become apparent from the detailed description, drawings and claims provided hereinafter. It should be understood that the detailed description, including disclosed embodiments and drawings, are merely exemplary in nature, intended for purposes of illustration only, and are not intended to limit the scope of the invention, its application, or use. Thus, variations that do not depart from the gist of the invention are intended to be within the scope of the invention.

DRAWINGS

DETAILED DESCRIPTION

The present disclosure is directed to a suspension system that provides good roadhandling, while also being operable to isolate vibrations, road noise, and bumps from the vehicle's occupants. To accomplish this, the suspension system according to the present disclosure can include a primary load bearing system that is always loaded (i.e., supports the normal weight of the vehicle), as well as a secondary load bearing system that is only engaged when the vehicle is subjected to increased loads or increased jounce. The secondary load bearing system can be a leaf spring suspension system that is tunable in a variety of ways such that, when the secondary load bearing system is engaged, the overall suspension system still achieves good roadhandling, while also being operable to isolate vibrations, road noise, and bumps from the vehicle's occupants.

Figure 1:
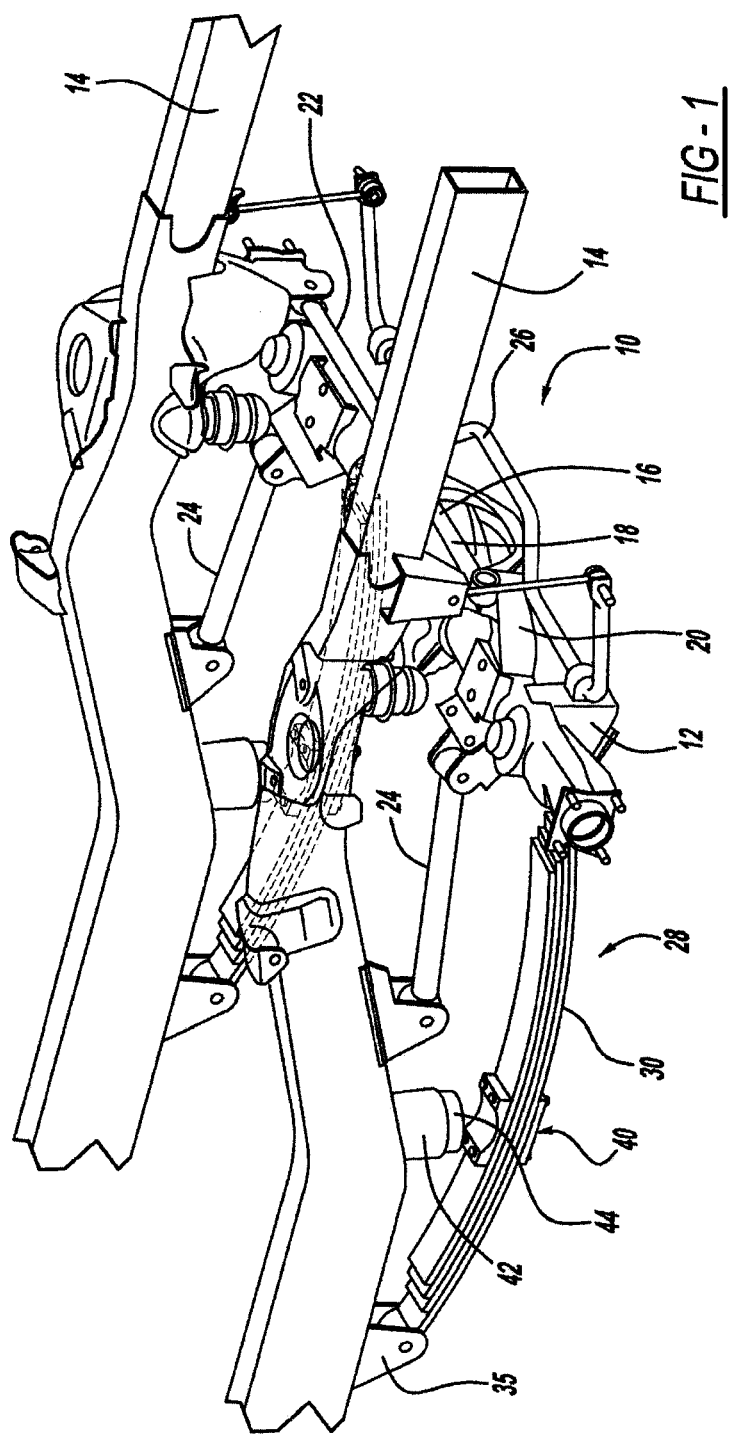
FIG. 1 is a perspective view of a suspension system according to a principle of the present disclosure.
Figure 2:
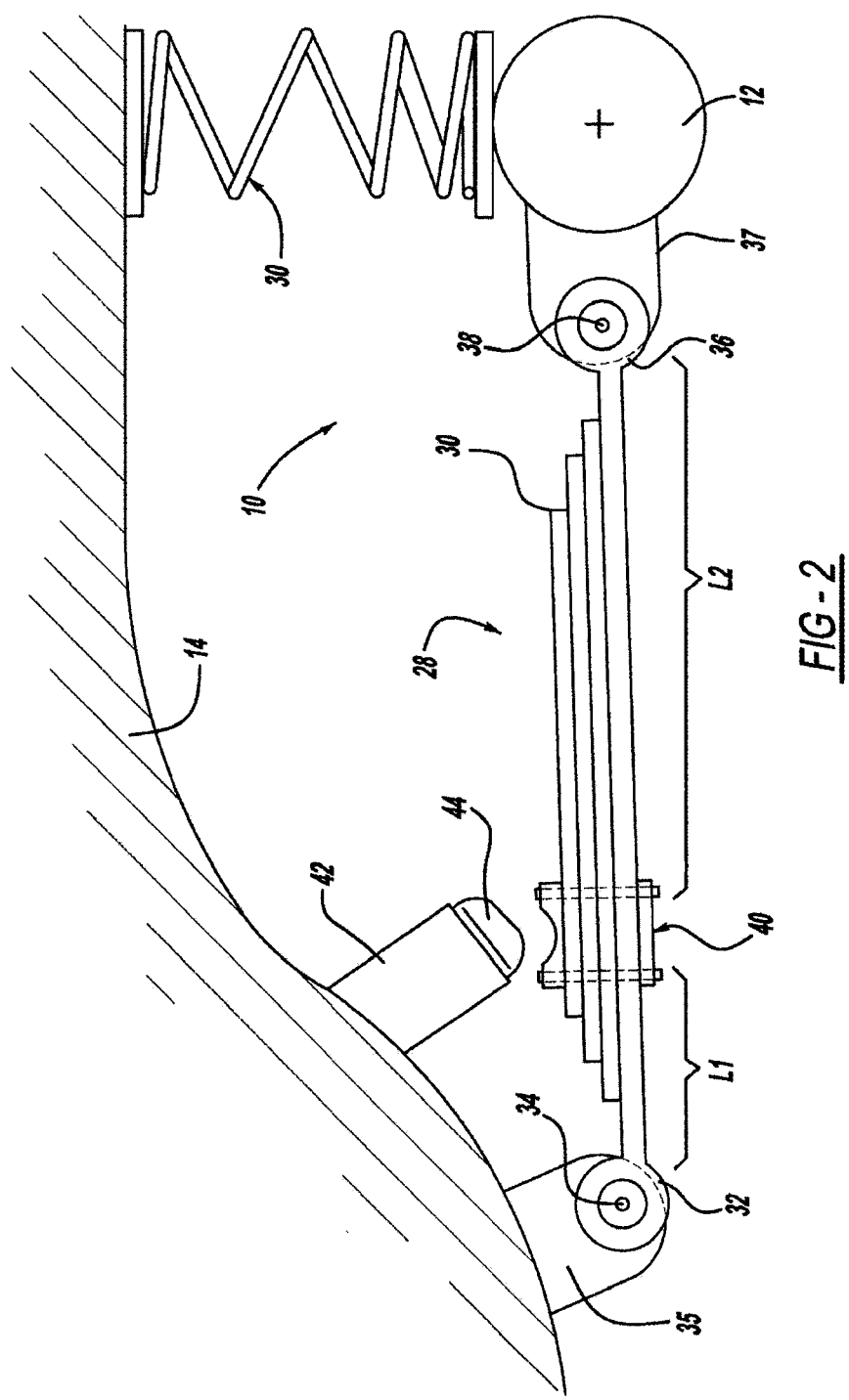
FIG. 2 is a schematic side view of a suspension system according to a principle of the present disclosure where a secondary load carrying system is in an unloaded condition.
Figure 3:
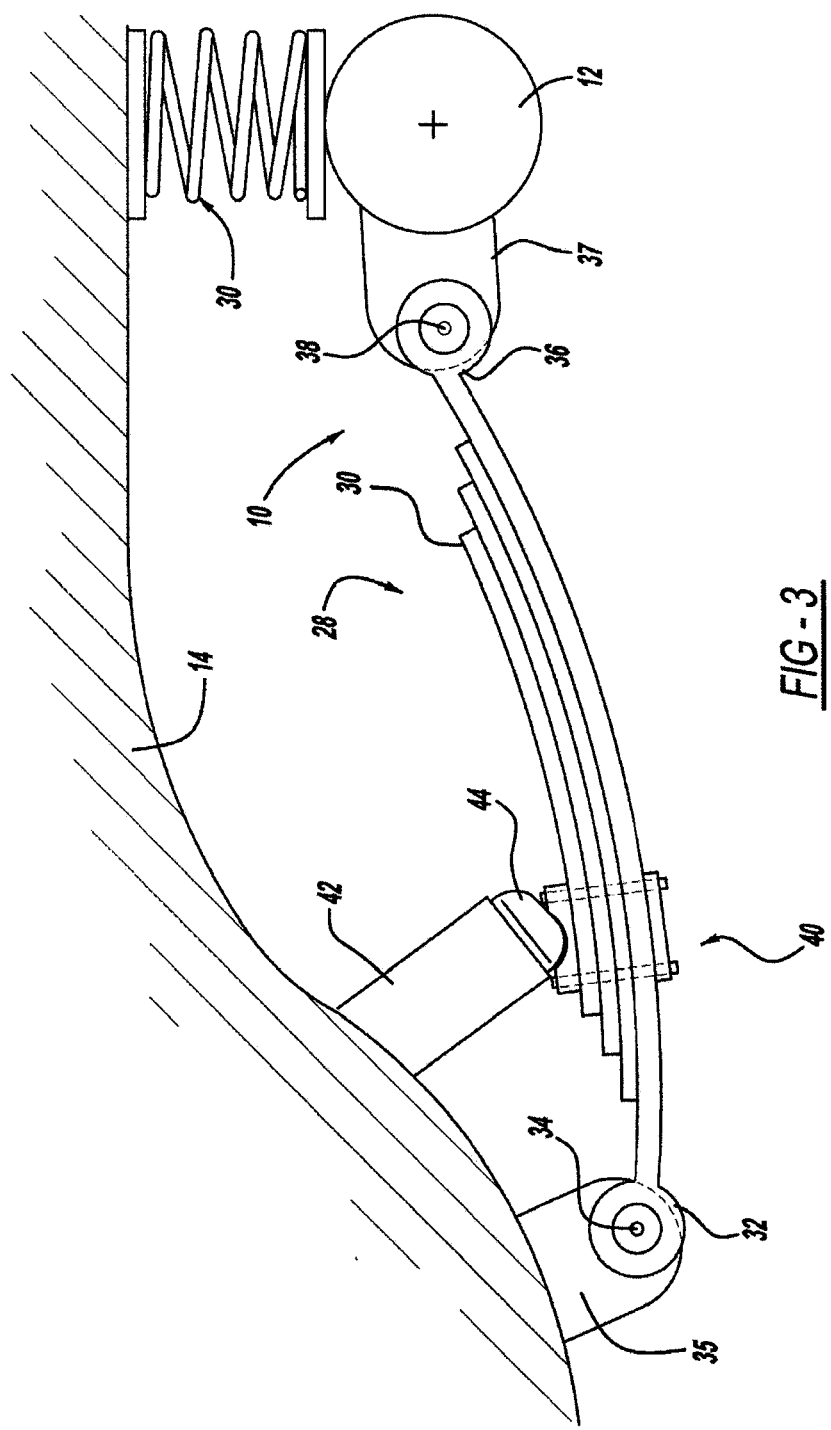
FIG. 3 is a schematic side view of the suspension system illustrated in FIG. 2 where the secondary load carrying system is in a loaded condition.

FIGS. 1-3 illustrate a suspension system 10 according to a principle of the present disclosure. Suspension system 10 is generally for a vehicle such as a truck, but is equally applicable to all types of vehicles. Suspension system 10 connects axle 12 to a frame 14 of the vehicle. While the purpose of suspension system 10 of the vehicle is to allow the wheels (not shown) to move vertically with respect to frame 14, it is undesirable to allow them to move forward and backwards (longitudinally), or side to side (laterally). Suspension system 10, therefore, can further include a track bar 16 to prevent lateral movement.

Track bar 16 runs sideways in the same plane as axle 12, including a first end 18 connected at one end 20 of axle 12 and a second end 22 connected to frame 14 on the opposite side of the vehicle. Track bar 16 can be attached on either end 18 or 22 pivotably to permit track bar 16 to swivel upwards and downwards only, so that axle 12 is allowed to move in the vertical plane only. As track bar 16 does not effectively locate axle 12 longitudinally, suspension system 10 can also include link arms 24 that stabilize axle 12 in the longitudinal direction.

Suspension system 10 can also include a stabilizer bar 26. Stabilizer bar 26 (also known as an anti-roll bar) is used along with shock absorbers or struts (not shown) to give the moving vehicle additional stability. Stabilizer bar 26 can be a metal rod that spans the entire axle 12 and effectively joins each side of suspension system 10 together. When suspension system 10 at one wheel moves up and down, stabilizer bar 26 transfers movement to the other wheel. This creates a more level ride and reduces vehicle sway. In particular, it combats the roll of the vehicle on suspension system 10 as the vehicle corners.

As noted above, suspension system 10 can include link arms 24 that stabilize the axle in the longitudinal direction. In general, a pair of link arms 24 is used on both sides of the vehicle (one link arm connecting a top of axle 12 to frame 14, and a second link arm connecting a bottom of axle 12 to frame 14). According to the present disclosure, however, one of the link arms 24 that connects axle 12 to frame 14 can be replaced by leaf spring assemblies 28 that act as secondary load carrying members.

More particularly, suspension system 10 can include primary load carrying members 30 (FIGS. 2 and 3). Primary load carrying members 30 can be coil springs that are loaded 100 percent of the time by the weight of the vehicle. If the vehicle carries a larger load or experiences a large amount of jounce, however, leaf spring assemblies 28 can be engaged to provide additional load carrying capability.

Leaf spring assemblies 28 include a plurality of slender arc-shaped leaves 30 of spring steel, or other composite material, that include a rectangular cross-section. One of the leaves 30 can include a first eyelet 32 that couples to a first bushing 34 formed on bracket 35 attached to frame 14, as well as a second eyelet 36 that couples to a second bushing 38 formed on a bracket 37 attached to axle 12. Alternatively, eyelets 32 and 36 can be separately formed and welded to one of lengths 30 of leaf spring assembly 28. Eyelets 32 and 36 and bushings 34 and 38 allow leaf spring assemblies 28 to pivot relative to axle 12 and frame 14, as required during use of the vehicle. Leaf spring assemblies 28, therefore, can also act in a manner similar to link arms 24.

The number of leaves 30 of spring steel is variable. For very heavy vehicles, leaf spring assemblies 28 can be made from several leaves 30 stacked on top of each other in several layers. Often but not required by the present disclosure, leaves 30 will have progressively shorter lengths to vary flex of each leaf 30 when loaded.

Connecting the plurality of lengths 30 of spring steel is a clamp 40. A distance between clamp 40 and first bushing 34 that connects leaves 30 to frame 14 can be described as a forward length L1, while a distance between clamp 40 and second bushing 38 that connects lengths 30 to axle 12 can be described as an aft length L2. Forward length L1 and aft length L2 can be unequal, which enables a position of clamp 40 to determine the effective link strength for suspension kinematics while controlling the motion of axle 12 as the vehicle moves up and down with respect to the ground and the wheels of the vehicle. Regardless, it should be understood that a position of clamp 40 can be modified to tune the kinematics of suspension system 10.

As noted above, leaf spring assemblies 28 act as secondary load carrying members. To engage leaf spring assemblies 28, a fulcrum bracket 42 is fixed to frame 14. As frame 14 moves toward axle 12 (or axle 12 moves toward frame 14) during carrying of increased loads or increased jounce, fulcrum bracket 42 can contact with clamp 40. Upon contact between fulcrum bracket 42 and clamp 40, lengths 30 of leaf spring assemblies 28 will begin to add rate (i.e., pounds/inch or N/mm) and load carrying capacity to suspension system 10.

Fulcrum bracket 42 can include a bumper 44 that dampens the contact between fulcrum bracket 42 and clamp 40, as well as reduces noise and vibration between fulcrum bracket 42 and clamp 40 during contact thereof. Bumper 44 can be formed of an elastomeric or rubber material, or any other material having damping and noise-reducing properties known to one skilled in the art. Further, bumper 44 should be water- and environmentally-resistant so that bumper 44 lasts throughout the useful life of suspension system 10.

Moreover, bumper 44 can be tuned or modified as required by the desired rate change of suspension system 10 and soften engagement of leaf spring assemblies 28. Although bumper 44 is illustrated as being attached to fulcrum bracket 42, one skilled in the art would readily acknowledge and appreciate that bumper 44 can be attached to clamp 40 without departing from the scope of the present disclosure. Lastly, it should be understood that fulcrum bracket 42 is not required to contact clamp 40 for operation of leaf spring assemblies 28 to be effective. In contrast, fulcrum bracket 42 can be adapted for direct contact with lengths 30 formed of spring steel without departing from the scope of the present disclosure.

A position of fulcrum bracket 42, relative to bushings 34 and 38 and eyelets 32 and 36, affects the load carried by bushings 34 and 38 and eyelets 32 and 36 and the corresponding brackets 35 and 37 attached to frame 14 and axle 12, respectively. Adjusting a position of fulcrum bracket 42, therefore, can control both the kinematics of axle 12 and loads on leaf spring assemblies 28, bushings 34 and 38, and eyelets 32 and 36.

Utilizing fulcrum bracket 42 to engage leaf spring assemblies 28 negates the need to directly clamp leaf spring assemblies 28 to frame 14 and axle 12. Rather, utilizing fulcrum bracket 42 to engage leaf spring assemblies 28 allows leaf spring assemblies 28 to be engaged only when a vehicle is carrying increased loads or experiences increased jounce. Such a design provides for only part time use of leaf spring assemblies 28 load carrying capacity. Accordingly, overall suspension system friction is reduced at lower loads (i.e., when leaf spring assemblies 28 are not engaged), which allows for improved vehicle ride at the lower loads.

In addition, suspension system 10 including leaf spring assemblies 28 as secondary load carrying members provides many tunable elements to suspension system 10. A position of fulcrum bracket 42, whether it be positioned forward or aft along leaf spring assemblies 28, or positioned at different vertical distances relative to leaf spring assemblies 28, can adjust the loads at which leaf spring assemblies 28 will be engaged. Other factors that affect tuning of suspension system 10 include the forward L1 and aft L2 lengths of leaves 30. This is affected by positioning clamp 40 at various positions along leaves 30. The number and lengths of leaves 30 also affects kinematics and load-carrying capabilities of leaf spring assemblies 28. By carefully selecting the characteristics of each element of suspension system 10, suspension system 10 can be adapted for use in a variety of vehicles including heavy duty trucks, light trucks, buses, tractors, locomotives, and passenger vehicles, without limitation.

Lastly, it should be appreciated that use of a fulcrum bracket 42 to engage leaf spring assemblies 28 enables the use of bushings and eyelets to connect leaf spring assemblies 28 to frame 14 and axle 12. By connecting leaf spring assemblies 28 to frame 14 and axle 12 in this manner, both the axle 12 and frame 14 can be isolated from leaf spring assemblies 28 when leaf spring assemblies are not engaged. Conventional leaf spring assemblies (e.g., Hotchkiss and cantilever) do not simultaneously isolate both axle 12 and frame 14. The ability for full isolation of both axle 12 and frame 14 assists in eliminating unwanted noises and vibration from suspension system 10 when leaf spring assemblies 28 are not in use.

What is claimed is:

1. A suspension system for a vehicle, comprising:
   a primary load carrying system that continually supports a load; and
   a secondary load carrying system that is engageable when the load of the vehicle is increased, the secondary load carrying system comprising a leaf spring assembly coupled to a frame and an axle of the vehicle such that the frame and the axle are isolated from the leaf spring assembly when the secondary load carrying system is not engaged.

2. The suspension system of claim 1, further comprising a leaf spring assembly engaging member, the leaf spring assembly engaging member engaging the leaf spring assembly when the load of the vehicle is increased.

3. The suspension system of claim 2, wherein the leaf spring assembly includes an engageable member for engagement with the engaging member.

4. The suspension system of claim 3, wherein the engaging member is a fulcrum bracket fixed to the frame and the engageable member is fixed to the leaf spring assembly.

5. The suspension system of claim 4, wherein positions of the fulcrum bracket and the engageable member are variable to tune the secondary load carrying system.

6. The suspension system of claim 3, wherein the engageable member includes a bumper.

7. The suspension system of claim 6, wherein the bumper is a rubber- or elastomeric-based material.

8. The suspension system of claim 6, wherein the bumper isolates vibrations of the leaf spring system when the engaging member is in engagement with the engageable member.

9. The suspension system of claim 1, wherein the leaf spring assembly is connected to the frame by a first eyelet and a first bushing, and the leaf spring assembly is connected to the axle by a second eyelet and a second bushing.

10. The suspension system of claim 1, wherein the leaf spring system includes a plurality of leaf springs.

11. A suspension system for a vehicle, comprising:
a primary load bearing system disposed between a frame and an axle of the vehicle, the primary load bearing system continually being loaded; and
a secondary load bearing system disposed between the frame and the axle of the vehicle, the secondary load bearing system being operable between a loaded condition and an unloaded condition,
wherein during the loaded condition, the secondary load bearing system is contacted by an engaging member attached to the frame such that a load carried by the vehicle is supported by the primary load bearing system and the secondary load bearing system, and
during the unloaded condition, the secondary load bearing system is isolated from the frame and the axle.

12. The suspension system of claim 11, wherein the secondary load bearing system is a leaf spring assembly.

13. The suspension system of claim 12, wherein the leaf spring assembly includes an engageable member that is contacted by the engaging member in the loaded condition to transfer a portion of the load to the secondary load bearing system.

14. The suspension system of claim 13, wherein positions of the engageable member and the engaging member are variable to tune the secondary load bearing system.

15. The suspension system of claim 12, wherein the leaf spring assembly is coupled to the frame and the axle by a pair of bushings, the pair of bushings isolating the leaf spring assembly from the frame and the axle during the unloaded condition.

16. The suspension system of claim 11, wherein the engaging member includes a bumper.

17. The suspension system of claim 16, wherein the bumper is a rubber- or elastomeric-based material.

18. The suspension system of claim 16, wherein the bumper isolates vibrations of the leaf spring system when the engaging member is in engagement with the engageable member.

* * * * *